UNITED STATES PATENT OFFICE.

IVAN LEVINSTEIN AND RICHARD HERZ, OF MANCHESTER, ENGLAND, ASSIGNORS TO THE LEVINSTEIN, LIMITED, OF SAME PLACE.

BLUE-BLACK TETRAZO DYE AND PROCESS OF MAKING SAME.

SPECIFICATION forming part of Letters Patent No. 634,009, dated October 3, 1899.

Original application filed June 14, 1897, Serial No. 640,753. Divided and this application filed January 3, 1899. Serial No. 701,063. (Specimens.)

*To all whom it may concern:*

Be it known that we, IVAN LEVINSTEIN, a citizen of the British Empire, and RICHARD HERZ, a citizen of the German Empire, residing at Manchester, in the county of Lancaster, England, have invented certain new and useful Improvements in Coloring-Matters, (patented in Great Britain, No. 2,946, February 10, 1896; in France, No. 260,268, October 8, 1896, and in Germany May 28, 1896,) of which the following is a full, clear, and exact description.

This application is a division of our application filed June 14, 1897, Serial No. 640,753.

The production of an alpha$_1$ alpha$_2$ naphthylenediamin sulfonic acid is described in the specification of Letters Patent of Great Britain No. 15,444, dated the 14th day of August, A. D. 1893. This acid is obtained by the nitration of the acetyl compound of alpha$_1$-naphthylamin beta$_3$ or beta$_4$ sulfonic acid and subsequent reduction and saponification. If treated with nitrous acid, it is decomposed and becomes incapable of reacting with amins or phenols. We have, however, discovered a new alpha$_1$-alpha$_2$ naphthylenediamin sulfonic acid which when treated with nitrous acid readily reacts with amins, diamins, their alkylated and phenylated compounds, with phenols, amidophenols, amidophenol ethers, and dioxy compounds both of the benzene and naphthalene series, as well as their known carboxyl and sulfonic acids. In the new coloring-matters thus formed only one of the amido groups of the naphthylenediamin sulfonic acids enters into the reaction. The second amido group remains free. This second amido group may be further diazotized, and thus diazo-azo compounds may be produced which, combined with amins, diamins, their alkylated and phenylated compounds, with phenols, amidophenols, amidophenol ethers, dioxy compounds both of the benzene and naphthalene series, as well as their known carboxyl and sulfonic acids, produce tetrazo colors which dye shades from yellow to deep black and possess very valuable properties. These tetrazo colors may be employed either for developing the colors on the fiber or for the production of coloring-matters in substance.

The new alpha$_1$ alpha$_2$ naphthylenediamin sulfonic acid may be used not only for the production of azo and tetrazo coloring-matters, but also, like all paradiamins, they may be employed in the manufacture of saffranins, indulins, and similar colors.

For the production of our new alpha$_1$ alpha$_2$ naphthylenediamin monosulphonic acid we may proceed, by way of example, as follows: 9.3 kilos of anilin are diazotized in the usual well-known manner and the diazobenzene thus obtained is combined, while stirring, with 24.5 kilos of the sodium salt of alpha$_1$ naphthylamin beta$_1$ monosulfonic acid dissolved in about five hundred liters of water. The temperature is preferably not allowed to exceed 15° centigrade. Stirring is continued for a few hours, when the formation of the coloring-matter is complete. The produced coloring-matter, which is in the form of a precipitate, is then filtered off and pressed. The thus-produced pressed cake is added to a boiling mixture of thirty kilos of iron borings, two hundred liters of water, and two kilos of ordinary commercial hydrochloric acid. When the reaction is finished, the mass is made slightly alkaline by means of sodium carbonate or other suitable alkali, and the free anilin is recovered by steam in the well-understood manner. The remaining solution, which contains the sodium salt of the new naphthylenediamin sulfonic acid is then separated from the iron by filtration or otherwise. The filtrate is now acidified, when the new sulfonic acid crystallizes out in fine needles having a slight red coloration.

In the manufacture of coloring-matters from our new sulfonic acid we may proceed as follows:

*First step.*—23.8 kilos of the new alpha$_1$ alpha$_2$ naphthylenediamin sulfonic acid are dissolved in a solution of about 5.3 kilos of sodium carbonate in two hundred liters of water or of other suitable alkali in equivalent molecular proportion. Ice is added, and when the mixture is cool the naphthylenediamin sulphonic acid is precipitated in a finelydivided state by means of one hundred kilos of acetic acid containing thirty per cent. acid. The mixture is well stirred and diazotized by an aqueous solution of 7.2 kilos of sodium nitrite. The amidodiazonaphthalene sulfonic acid separates out after some time as a difficultly-soluble powder of a brownish-yellow color. Instead of acetic acid, which we prefer to use, other suitable acid or acids may be employed.

*Second step.*—The amidodiazonaphthalene sulfonic acid produced in the first step and obtained from 23.8 kilos of alpha$_1$ alpha$_2$ naphthylenediamin sulfonic acid is added at ordinary temperature and while stirring to an alkaline solution of thirty-five kilos of betanaphthol disulfonic acid R. The combination begins at once and is completed within a short time. The coloring-matter thus obtained is salted out, filtered, pressed, and dried. It dyes wool in an acid-bath a blue color.

Other dyestuffs may be obtained in an analogous manner if in place of betanaphthol disulfonic acid R other compounds are used—such, for example, as amins, diamins, their alkylated and phenylated compounds, amidophenols, amidophenol ethers, dioxy compounds both of the benzene and naphthalene series, as well as their known carboxyl and sulfonic acids. In such cases it will be obvious to chemists that equivalent molecular proportions to those hereinbefore specified should be employed.

*Third step.*—Sixty-two kilos of the azo dyestuff prepared as above set forth and produced in the second step is dissolved in about three hundred liters of water acidulated with seventy kilos of hydrochloric acid, 20° Baumé. To the diluted solution, cooled with ice, there is gradually added a solution containing 7.2 kilos of sodium nitrite. The whole mixture is well stirred and kept at a low temperature. The solution, which was originally a violet-blue, changes to a deep red. After a few hours the original dyestuff will be found to be completely transformed in the new diazo-azo compound, which may either be at once used for combination or be precipitated by means of common salt. The diazo-azo compound, either in solution or in a precipitated form, is added while stirring to an alkaline solution of 14.5 kilos of betanaphthol. An excess of caustic alkali is to be avoided. After the reaction is completed the produced tetrazo coloring-matter is precipitated or may be completely separated as a dark-blue precipitate by means of common salt. It dyes wool in a neutral or acid bath a deep blue to black.

Analogous dyestuffs are produced if, in place of betanaphthol, other phenols or amins, diamins, or their alkylated or phenylated compounds, dioxy compounds both of the benzene and naphthalene series as well as their known carboxylic and sulfonic acids are used. If, for example, instead of 14.5 kilos of betanaphthol, in step III, there is combined with the diazo compound 14.5 kilos of betanaphthylamin, and the combination is carried out in a sodium acetate solution, a coloring-matter is obtained which dies wool in a neutral or acid bath a deep black, which is distinguished by its fastness to milling and to light.

Having now particularly described and ascertained the nature of our said invention and in what manner the same is to be performed, we declare that what we claim is—

1. The process for the production of a bluish-black tetrazo coloring-matter from the alpha$_1$ alpha$_2$ naphthylenediamin beta$_1$sulfonic acid which consists in diazotizing that acid, combining the resulting sulfonic acid with beta$_1$ naphthol beta$_2$ beta$_3$ disulfonic acid, rediazotizing the thus-produced amidoazo coloring-matter, and finally combining the resulting diazo compound with betanaphthol, substantially as described.

2. The process for the production of blue to deep black tetrazo coloring-matters from the alpha$_1$ alpha$_2$ naphthylenediamin beta$_1$ sulfonic acid which consists in diazotizing that acid, combining the resulting sulfonic acid with beta$_1$ naphthol beta$_2$ beta$_3$ disulfonic acid, rediazotizing the thus-produced amidoazo coloring-matter, and finally combining the resulting diazo compound with aromatic dyestuff components, substantially as described.

3. The process for the production of tetrazo coloring-matters from the alpha$_1$ alpha$_2$ naphthylenediamin beta$_1$ sulfonic acid, which consists in diazotizing that acid, combining the resulting amidodiazonaphthalene sulfonic acid with color components of the naphthalene series, rediazotizing the thus-produced amidoazo coloring-matter, and combining the diazo product with hereinbefore-described aromatic dyestuff components, substantially as described.

4. The process for the production of a bluish-violet amidoazo coloring-matter from the alpha$_1$ alpha$_2$ naphthylenediamin beta$_1$ sulfonic acid which consists in diazotizing that acid, and then combining the resulting amidodiazonaphthalene sulfonic acid with beta$_1$ naphthol beta$_2$ beta$_3$ disulfonic acid, substantially as described.

5. The process for the production of amidoazo coloring-matters from the alpha$_1$ alpha$_2$ naphthylenediamin beta$_1$ sulfonic acid which consists in diazotizing that acid, and then combining the thus-produced amidodiazonaphthalene sulfonic acid with color components of the naphthalene series, substantially as described.

6. As a new article of manufacture, the bluish-black tetrazo coloring-matter hereinbefore set forth, which has the formula

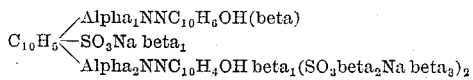

is a dark bluish-black powder with metallic luster soluble in water with a blue color, and in concentrated $H_2SO_4$ with a green color, is insoluble in alcohol, forms a dark-blue precipitate by the addition of HCl to its aqueous solution, and which produces on animal and chrome mordanted fibers dark-blue to bluish-black shades which are fast to milling, substantially as described.

In witness whereof we subscribe our signatures in presence of two witnesses.

IVAN LEVINSTEIN.
RICHARD HERZ.

Witnesses:
WILLIAM E. HEYS,
ARTHUR MILLWARD.